(12) United States Patent
Newburn et al.

(10) Patent No.: US 8,171,270 B2
(45) Date of Patent: May 1, 2012

(54) ASYNCHRONOUS CONTROL TRANSFER

(75) Inventors: Chris J. Newburn, South Beloit, IL (US); Dion Rodgers, Hillsboro, OR (US); Robert Knight, Mahomet, IL (US); Ittai Anati, Haifa (IL); Aaron N. Levinson, Beaverton, OR (US); Gautham Chinya, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 59 days.

(21) Appl. No.: 11/648,187

(22) Filed: Dec. 29, 2006

(65) Prior Publication Data
US 2008/0162910 A1 Jul. 3, 2008

(51) Int. Cl.
*G06F 9/00* (2006.01)
(52) U.S. Cl. .................. 712/244; 712/243; 712/E9.032
(58) Field of Classification Search .................. 712/244, 712/E9.032
See application file for complete search history.

(56) References Cited

U.S. PATENT DOCUMENTS

| | | | |
|---|---|---|---|
| 4,594,660 A * | 6/1986 | Guenthner et al. ............. | 712/23 |
| 5,303,378 A * | 4/1994 | Cohen .......................... | 710/264 |
| 5,625,788 A * | 4/1997 | Boggs et al. .................. | 712/214 |
| 5,694,606 A * | 12/1997 | Pletcher et al. ............... | 710/261 |
| 5,978,857 A * | 11/1999 | Graham ........................ | 719/312 |
| 6,148,321 A * | 11/2000 | Hammond .................... | 718/100 |
| 6,219,774 B1 * | 4/2001 | Hammond et al. ........... | 711/202 |
| 6,408,386 B1 * | 6/2002 | Hammond et al. ........... | 712/244 |
| 6,574,683 B1 * | 6/2003 | Comisky et al. ................. | 710/23 |
| 6,697,810 B2 * | 2/2004 | Kumar et al. .................... | 707/10 |
| 6,708,326 B1 * | 3/2004 | Bhattacarya .................. | 717/124 |
| 6,842,812 B1 * | 1/2005 | Roth et al. ..................... | 710/262 |
| 2002/0019902 A1 * | 2/2002 | Christie ......................... | 710/260 |
| 2002/0124237 A1 * | 9/2002 | Sprunt et al. .................. | 717/127 |
| 2004/0163083 A1 * | 8/2004 | Wang et al. ................... | 718/102 |
| 2005/0071840 A1 * | 3/2005 | Neiger et al. ..................... | 718/1 |
| 2005/0166039 A1 * | 7/2005 | Wang et al. ................... | 712/227 |
| 2006/0277395 A1 * | 12/2006 | Fowles .......................... | 712/227 |
| 2006/0282839 A1 * | 12/2006 | Hankins et al. ............... | 719/318 |
| 2006/0294347 A1 * | 12/2006 | Zou et al. ...................... | 712/244 |
| 2007/0079020 A1 * | 4/2007 | Chinya et al. .................. | 710/40 |
| 2007/0079294 A1 * | 4/2007 | Knight et al. ................. | 717/130 |
| 2007/0079298 A1 * | 4/2007 | Tian et al. ..................... | 717/140 |

(Continued)

FOREIGN PATENT DOCUMENTS
JP 2004-362561 A 12/2004

OTHER PUBLICATIONS

C. Cranor et al., Architecture considerations for CPU and network interface integration. IEEE Micro Jan.-Feb. 2000, pp. 18-260.*

(Continued)

*Primary Examiner* — Idriss N Alrobaye
(74) *Attorney, Agent, or Firm* — Trop, Pruner & Hu, P.C.

(57) ABSTRACT

Methods and apparatus to perform asynchronous control transfer are described. In one embodiment, upon occurrence of an event (e.g., an architectural event), a service routine data block (SRDB) is accessed via a service routine base pointer (SRDS) and a service routine offset value (SRDBP) to obtain the address of a yield service routine via a service routine instruction pointer (SRIP) and a service routine code segment (SRCS). Other embodiments are also described.

30 Claims, 6 Drawing Sheets

U.S. PATENT DOCUMENTS

2007/0214342 A1* 9/2007 Newburn et al. ............... 712/216
2008/0065804 A1* 3/2008 Chinya et al. ................. 710/269

OTHER PUBLICATIONS

Geoff Coulson, A Configurable Multimedia Middleware Platform, IEEE MultiMedia, v.6 n. 1, p. 62-76, Jan. 1999.*

Chinya, Gautham, et al., "Event Handling for Architectural Events At High Privilege Levels", Intel Ref: P24237, US Application filed Sep. 8, 2006, assigned U.S. Appl. No. 11/517,700.

Zou, Xiang, et al., "A Programmable Event-Driven Yield Mechanism", Intel Ref: P22028: Pending/Non-Published Application U.S. Appl. No. 11/395 884, filed Mar. 31 2006.

Office Action Received for Japanese Patent Application No. 2007-334336 mailed on Feb. 8, 2011, 8 Pages of Office Action including 4 pages of english Translation.

Office Action Received for Chinese Patent Application No. 200710307263.7 mailed on May 12, 2010, 16 Pages of Office Action including english Translation.

Office Action Received for German Patent Application No. 10 2007 060 783.2-53 mailed on May 12, 2010, 5 Pages of Office Action including english Translation.

Office Action Received for German Patent Application No. 10 2007 060 783.2-53 mailed on Apr. 7, 2009 5 Pages of Office Action including english Translation.

Jacob et al., "Virtual memory in contemporary microprocessors", In IEEE Micro, vol. 18, Issue 4, Jul./Aug. 1998, pp. 60-75.

China State Intellectual Property Office, Office Action mailed Sep. 2, 2011 in Chinese application No. 200710307263.7.

* cited by examiner

ASYNCHRONOUS CONTROL TRANSFER

BACKGROUND

The present disclosure generally relates to the field of electronics. More particularly, an embodiment of the invention relates to techniques for asynchronously controlling execution flow in a processor after occurrence of a select event.

Various mechanisms may be used to change the flow of control (such as the processing path or instruction sequence being followed) in a processor. For example, an interrupt may be used to change the flow of control in a processor asynchronously. Generally, a traditional interrupt is triggered by an external device on a different integrated circuit chip than a processor. In turn, the processor may respond to the interrupt by jumping to an interrupt handler routine. However, interrupts may be generally masked by the operating system or other software programs with a lower privilege level than the operating system and there may be no opportunity to modify such control flow changing conditions without modifying the operating system (OS). Accordingly, the current techniques for asynchronously changing the flow of control in a processor may be limiting, in part, because such techniques may rely on interrupts generated by external devices.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
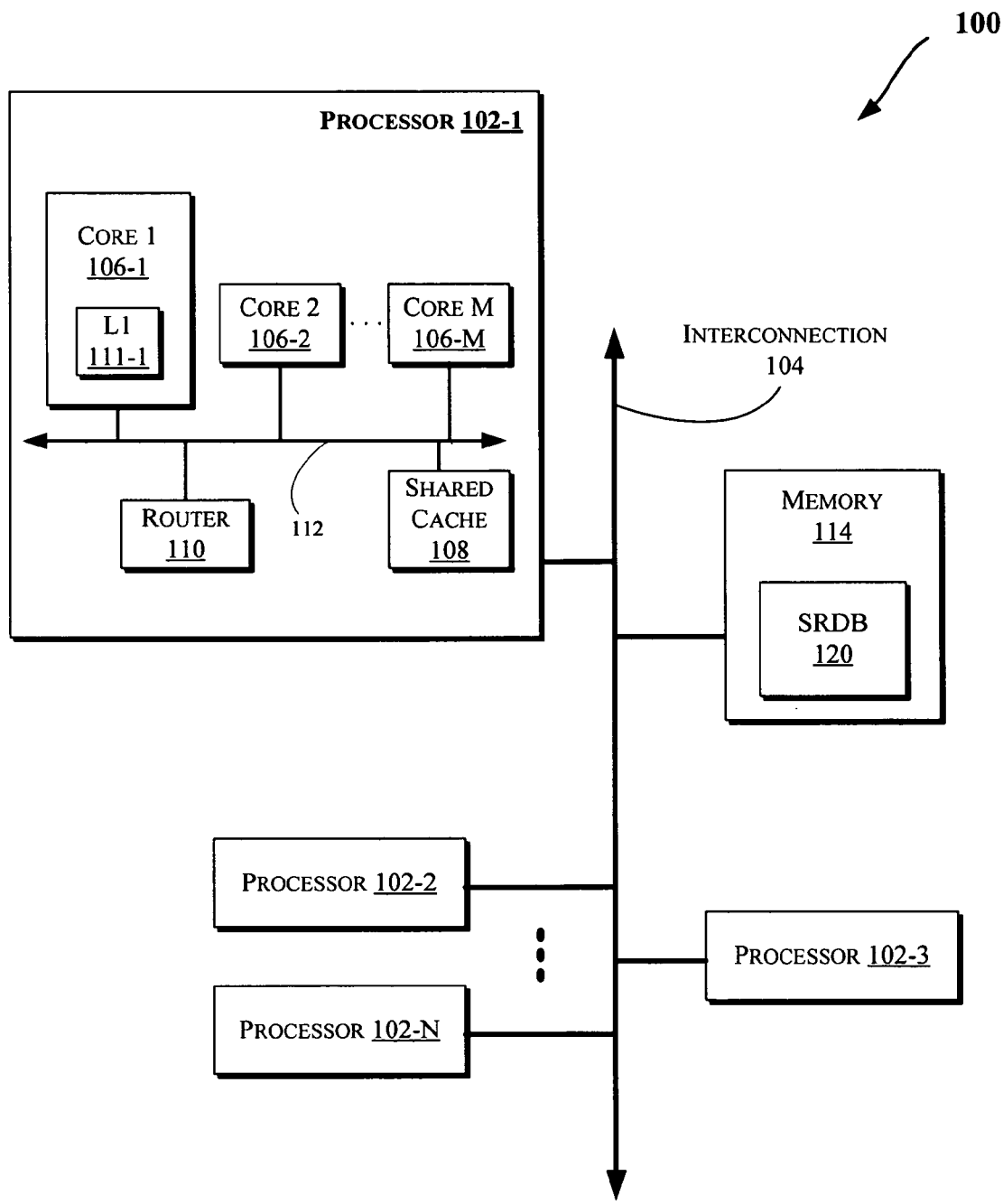
FIGS. 1, 5, and 6 illustrate block diagrams of embodiments of computing systems, which may be utilized to implement various embodiments discussed herein.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various mechanisms, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some of the embodiments discussed herein may be utilized to perform event handling operations. In an embodiment, an "event" refers to a condition that may or may not require some action to be taken by logic. Furthermore, events may be classified into different types based on the action that is to be taken. For example, certain exceptions (such as divide by zero) may be characterized as synchronous events that occur each time a corresponding instruction is executed. On the other hand, interrupts that are generated by external devices may be characterized as asynchronous events, in part, because they may occur at any time. In one embodiment, an "architectural event" refers to an event or condition that may be monitored, e.g., by programming information corresponding to the architectural event into a channel as discussed with reference to FIG. 2. In an embodiment, software may configure a channel to monitor certain architectural events which may not otherwise be observable by software and/or hardware. For example, a last level cache miss may be defined as an architectural event that is used to perform dynamic profile guided optimizations. Also, an architectural event may be defined to monitor conditions that are occurring on a co-processor that is located on the same integrated circuit chip as a processor, or otherwise in communication with the processor. In an embodiment, an "architectural event" may generally refer to an event or condition that occurs within processing resources or other logic present on the same integrated circuit chip as a processor. In some embodiments, architectural events may be supported in various generations of a processor.

In one embodiment, after an event (such as an architectural event) occurs (or is detected to occur), the corresponding occurrence response (e.g., a yield) may be initiated by utilizing an address that is stored in a storage unit. The address may point to the target response (e.g., a yield event handler routine, which may be referred to as a yield service routine). Further, the storage unit (which may be referred to as service routine data block (SRDB)) may store information to prepare the computing system to respond to the event or condition, e.g., switch stacks, transfer control, and/or use a new memory context. The storage unit may also provide space to store system context that may be restored after the event or condition is handled.

In an embodiment, various logic provided in a processor may be used to perform event handling tasks, such as the processors discussed with reference to FIGS. 1, 2, 5, and 6. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, and/or a router 110. The processor cores 106 may be implemented on a single integrated circuit (IC) chip. Moreover, the chip may include one or more shared caches (such as cache 108) and/or private caches (such as level 1 (L1) cache 111-1, generally referred to herein as "L1 cache 111"), buses or interconnections (such as a bus or interconnection network 112), memory controllers (such as those discussed with reference to FIGS. 5 and 6), or other components.

In one embodiment, the router 110 may be used to communicate between various components of the processor 102-1 and/or system 100. Moreover, the processor 102-1 may include more than one router 110. Furthermore, the multitude of routers (110) may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, a service routine data block (SRDB) 120 may be stored in the memory 114. Moreover, the SRDB 120 may be utilized by a component of the core 106 to cause invocation of a yield service routine in response to an event occurrence, as will be further discussed herein, for example, with reference to FIGS. 2-4.

Figure 2:
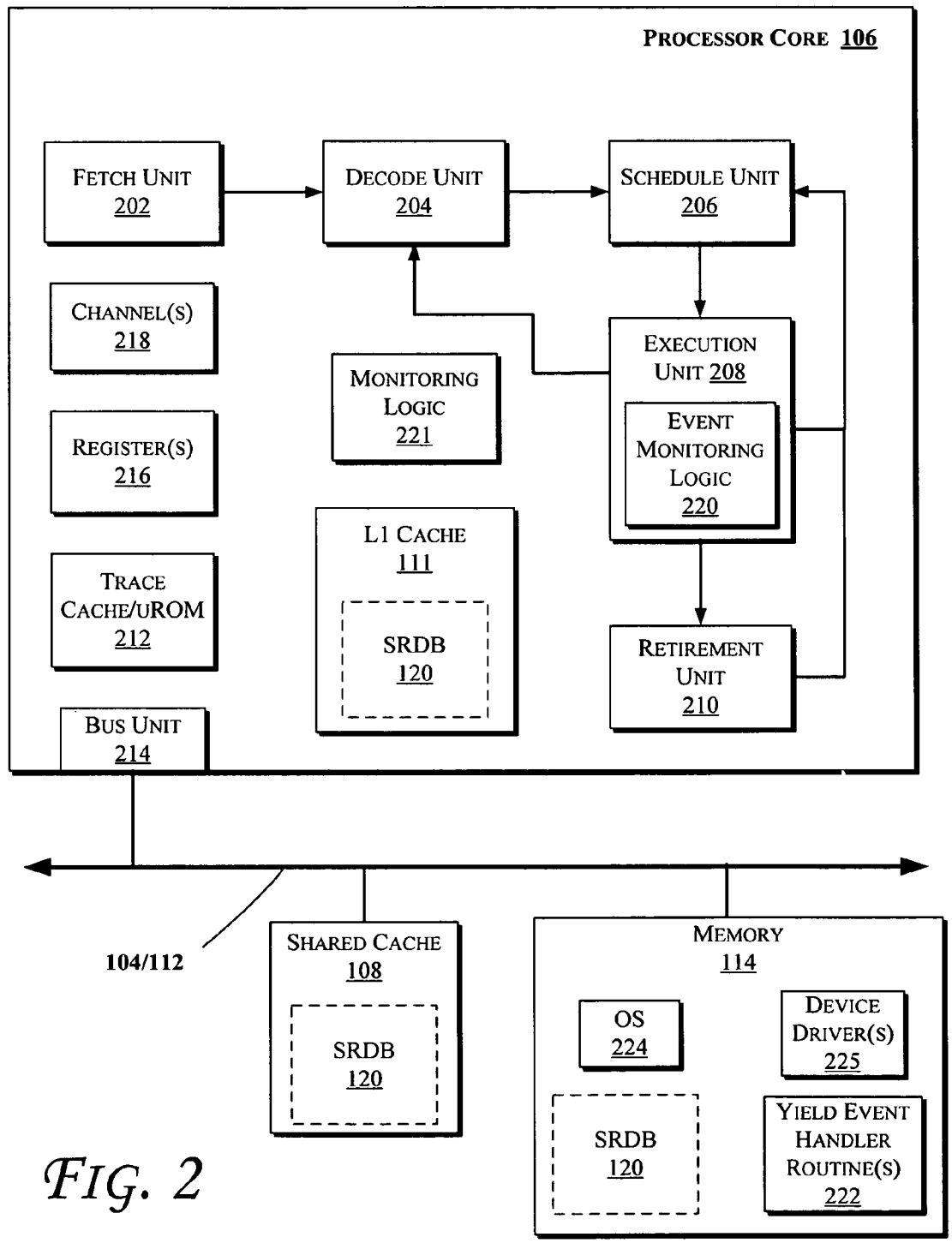
FIG. 2 illustrates a block diagram of portions of a processor core and other components of a computing system, according to an embodiment of the invention.

FIG. 2 illustrates a block diagram of portions of a processor core 106 and other components of a computing system, according to an embodiment of the invention. In one embodiment, the arrows shown in FIG. 2 illustrate the flow direction of instructions through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), memory controllers, or other components.

As illustrated in FIG. 2, the processor core 106 may include a fetch unit 202 to fetch instructions for execution by the core 106. The instructions may be fetched from any storage devices such as the memory 114 and/or the memory devices discussed with reference to FIGS. 5 and 6. The core 106 may also include a decode unit 204 to decode the fetched instruction. For instance, the decode unit 204 may decode the fetched instruction into a plurality of uops (micro-operations). Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). In an embodiment, the execution unit 208 may include more than one execution unit, such as a memory execution unit, an integer execution unit, a floating-point execution unit, or other execution units. The execution unit 208 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 208.

Further, the execution unit 208 may execute instructions out-of-order. Hence, the processor core 106 may be an out-of-order processor core in one embodiment. The core 106 may also include a retirement unit 210. The retirement unit 210 may retire executed instructions after they are committed. In an embodiment, retirement of the executed instructions may result in processor state being committed from the execution of the instructions, physical registers used by the instructions being de-allocated, etc.

The core 106 may additionally include a trace cache or microcode read-only memory (uROM) 212 to store microcode and/or traces of instructions that have been fetched (e.g., by the fetch unit 202). The microcode stored in the uROM 212 may be used to configure various hardware components of the core 106. In an embodiment, the microcode stored in the uROM 212 may be loaded from another component in communication with the processor core 106, such as a computer-readable medium or other storage device discussed with reference to FIGS. 5 and 6. The core 106 may also include a bus unit 214 to enable communication between components of the processor core 106 and other components (such as the components discussed with reference to FIG. 1) via one or more buses (e.g., buses 104 and/or 112). The core 106 may additionally include one or more registers 216 to store data accessed by various components of the core 106.

Furthermore, the processor core 106 illustrated in FIG. 1 may include one or more channels 218 that correspond to a set of architecture states. Each privilege level (such as privilege level 0 or supervisor privilege level (e.g., the highest privilege level), privilege level 3 (e.g., a relatively lower privilege level that may correspond to a user level privilege in an embodiment), etc.) may have a corresponding channel. Further, each channel 218 may also be configured with one or more scenarios where a scenario defines a logical condition. Therefore, a channel may contain a set of architectural states and also a configured logical condition description. In an embodiment, the channels 218 may contain scenario specifications. In turn, a yield event may be signaled when the architectural state in the channel matches or exceeds the channel's configured logical condition (i.e. scenario). Hence, a yield event may be the occurrence response to a scenario. Further details regarding an embodiment of a channel will be discussed with reference to FIG. 3.

Additionally, the core 106 may include an event monitoring logic 220, e.g., to monitor the occurrence of one or more events that may be associated with architecturally defined scenarios (e.g., in the channel(s) 218) that may be used to trigger a corresponding yield event. As shown in FIG. 2, the logic 220 may be provided within the execution unit 208. However, the logic 220 may be provided elsewhere in the processor core 106. As will be further discussed herein, e.g., with reference to FIGS. 3-4, the logic 220 may generate a signal after a monitored event occurs and a monitoring logic 221 may in response update data stored in the SRDB 120 and/or a stack (which may be stored in the memory 114, L1 cache 111, and/or shared cache 108), e.g., based on data stored in the channels 218. For example, the events that are being monitored (e.g., with reference to data stored in the channels 218) may occur asynchronously with respect to the execution of the current instruction sequence on the processor core 106.

Moreover, as shown in FIG. 2, the SRDB 120 may be stored (or cached) in one or more of the caches 111 and/or 108, instead of or in addition to the memory 114. The memory 114 may also store one or more: yield event handler or service routine(s) 222 (e.g., that may be invoked in response to detection of an event by the logic 220), operating systems 224 (e.g., to manage hardware or software resources of a computing system that includes the core 106), and/or device drivers 225 (e.g., to enable communication between the OS 224 and various devices such as those discussed with reference to FIGS. 5 and 6). In one embodiment, after the logic 220 causes monitoring logic 221 to access the SRDB 120 in response to detection of a monitored event, the address of a yield service routine (222) may be obtained from the SRDB 120.

Figure 3:
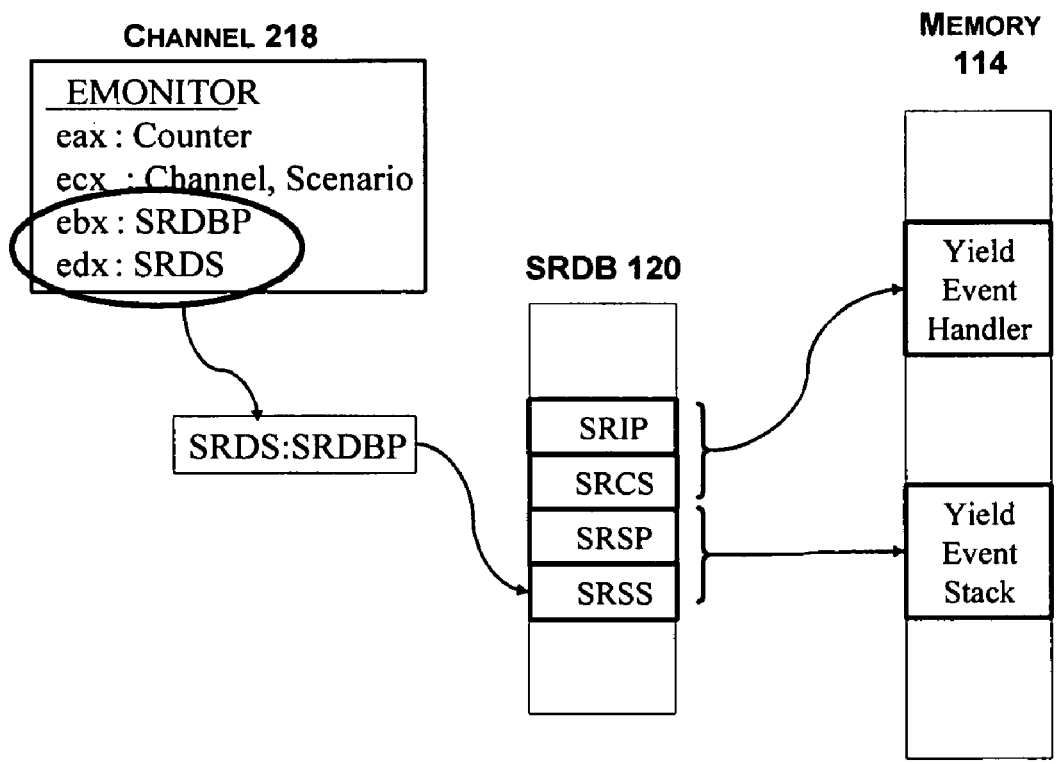
FIG. 3 illustrates various portions of a computing system, according to an embodiment.

FIG. 3 illustrates various portions of a computing system, according to an embodiment. For example, possible information stored in a channel 218 is shown in FIG. 3 and may be passed in to the channel as parameters of an EMONITOR instruction in accordance with at least one instruction set architecture. Those parameters may include scenario-specific information in a register eax, channel identifier and/or scenario identifier in a register ecx, a base pointer (SRDS) in a register edx, and an offset value (SRDBP) in a register ebx. The scenario-specific information in the register eax may indicate a count value, which counts down from an initial value called a sample after value, and when it reaches zero, its underflow may cause a yield service routine to be invoked. The larger this sample after value is the lower the sampling rate. The channel identifier may indicate the channel to be configured by the execution of the instruction. The scenario identifier indicates a unique identifier for the scenario to which the channel identified by the channel identifier is configured. SRDS and SRDBP may collectively act as a pointer to the location of the associated SRDB 120. The SRDB 120 may include a service routine stack segment (SRSS) which together with a service routine stack pointer (SRSP) identifies a corresponding yield event stack stored in the memory 114. Alternatively, a single value may be used to point to or index into the SRDB 120. As shown in FIG. 3, the SRDB 120 may also store a service routine instruction pointer (SRIP) and a service routine code segment (SRCS) that collectively indicate a yield service (222) routine stored in the memory 114. In various embodiments, any or all of the fields that reside in the SRDB 120 may reside in the processor core (106) instead. Keeping them in memory may reduce the amount of software thread-specific state that may need to be context switched.

Accordingly, the SRDB 120 may store the information that may be used to switch stacks, transfer control and use a new data memory context in an embodiment. Moreover, the SRDB 120 may remain in application memory (e.g., a portion of the memory 114) across context switches, and need not be saved or restored. Furthermore, a single value may be used to point to the yield service routine (222) and/or yield event stack stored in the memory 114. Also, the yield service routine (222) and/or yield event stack may be stored in the L1 cache 111 and/or shared cache 108, in addition to or instead of the memory 114 (which may be an application memory portion of the memory 114 for example). Also, data may be stored in the SRDB 120 in any order. Hence, the structure of SRDB 120 shown is FIG. 3 is merely an example of one embodiment.

Figure 4:
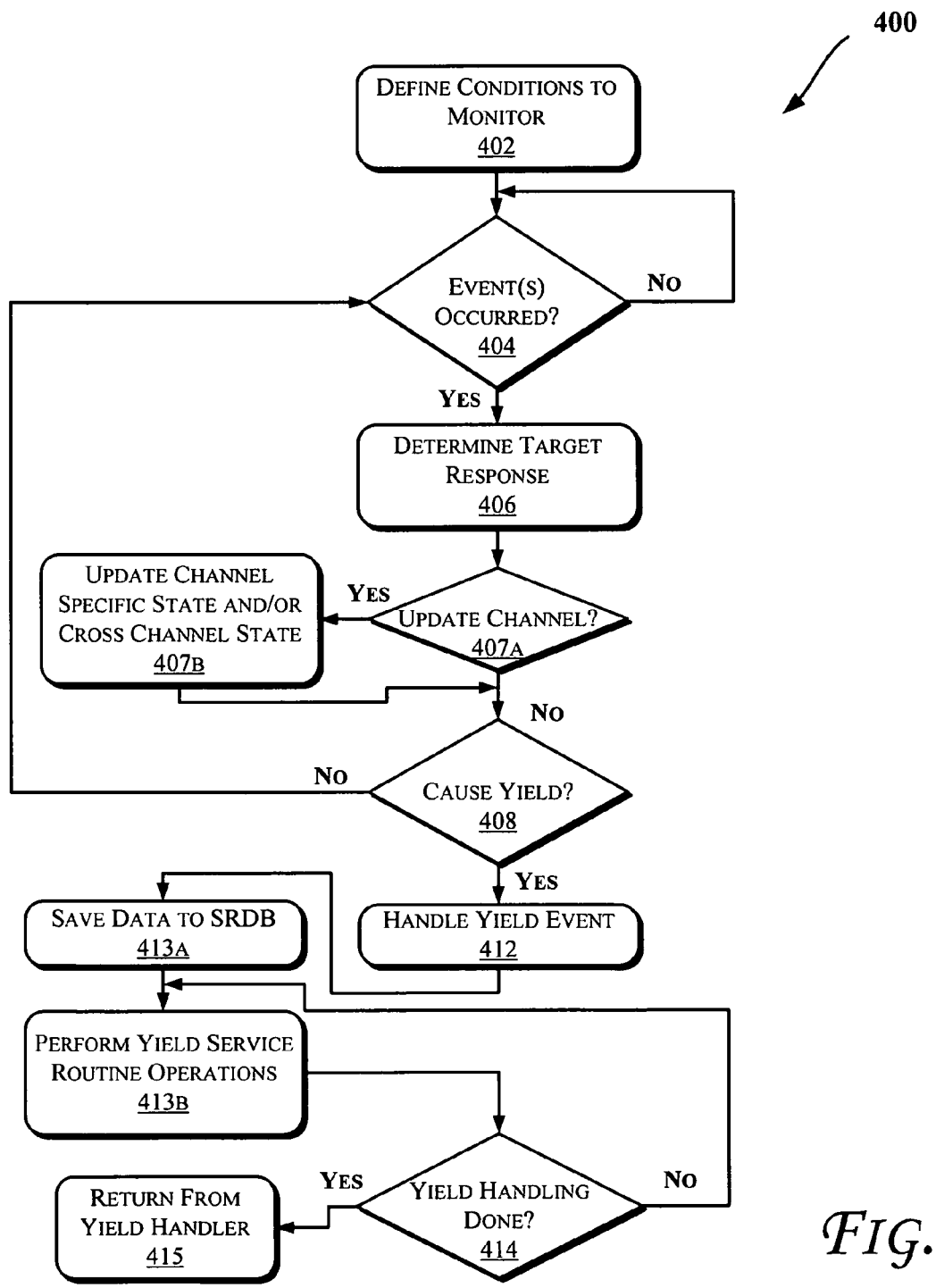
FIG. 4 illustrates a flow diagram of a method to cause generation of a yield in response to occurrence of an event, according to an embodiment.

FIG. 4 illustrates a flow diagram of a method 400 to cause generation of a yield in response to occurrence of an event, according to an embodiment. In some embodiments, various components discussed with reference to FIGS. 1-3 and 5-6 may be utilized to perform one or more of the operations discussed with reference to FIG. 4. For example, at least some of the operations discussed with reference to FIG. 4 may be performed by reference to the SRDB entries discussed with reference to FIGS. 2 and 3.

Referring to FIGS. 1-4, at an operation 402, various conditions (such as scenarios) may be defined (e.g., by a programmer). In an embodiment, data corresponding to the defined conditions of operation 402 may be stored in the channels 218. Also, various information relating to the SRDB 120 of FIGS. 2 and 3 may be configured at operation 402, such as one or more of the values to index into the SRDB 120 that may be stored in a channel 218, such as discussed with reference to FIG. 3. At an operation 404, it is determined whether one or more events (e.g., architectural events corresponding to a scenario) have occurred. In an embodiment, the logic 220 may determine whether one or more events in a channel 218 have occurred at operation 404.

Once operation 404 determines the occurrence of a monitored event, the target response may be determined at an operation 406. For example, data stored in the channel 218 may be accessed at an operation 406, such as discussed with reference to FIG. 3. At an operation 406 and an operation 407a, it is determined whether the corresponding state is to be updated. Some of that state may be channel-specific, such as counter values, and some may be shared across channels (cross-channel state), such as a pointer to the instruction on which a yield was taken or branch history information. At an operation 408, it may be determined whether data corresponding to a current event is also to be saved in memory. At an operation 408, it may be determined whether a yield is to be caused). If so, an operation 412 may handle the operations necessary to invoke the yield service routine. For example, upon occurrence of a monitored event, the current SS, SP, DS, CS, IP and flags values may be stored in the SRDB 120 at operation 413a, and the SS, SP, DS, CS and IP associated with the service routine may be loaded from the SRDB into the processor. The SS and SP may not be saved in the SRDB and switched to the values stored in the SRDB, in embodiments that do not, or find it unnecessary to, switch stacks. In an alternate embodiment, information from the execution context prior to the yield that would be saved in the SRDB may instead be saved to the stack, and restored at the end of the service routine. In yet another embodiment, that information may be put on a stack that is pointed to by the SRDB. These approaches may facilitate nesting of yield event handling, e.g., when a yield service routine is invoked while another yield service routine has not finished execution.

In an embodiment, during the yield service routine, the channel-specific and cross-channel state may be read out into processor registers or memory. This state may be processed, and other actions may be taken, as shown in 413B. Once yield handling is done, as shown in 414, a specific instruction may be executed at the end of the yield service routine (222) to indicate that event handling is finished (415). The data that was previously saved in the SRDB or on the stack (e.g. SS, SP, DS, CS, IP, and flags) before invoking the yield service routine may be restored to the processor and execution of the instruction stream continues.

In some embodiments, yields may be nested. That is, while executing a yield service routine, the conditions for taking another yield may be met, for example, after yields have been unblocked (e.g., by clearing a yield block bit (YBB)) by the yield service routine. If such nesting is to be allowed, then in an embodiment, the following operations may be performed prior to clearing the YBB:

(1) Read the SRDB 120 segment base (SRDS) and offset (SRDBP) from the channel, and use it to find the SRDB and then modify the SRSP field in the SRDB.

(2) Adjust that SRSP field, either down just below the current SRSP, if room is known to be available, or to another stack. Create a link between stacks as needed in the SRDB 120. This may involve storing information on the new stack that points either to the SRDB or to the old stack, so that stack walking routines and debuggers may navigate smoothly across the stack transition.

Furthermore, the following may be performed prior to exiting a yield service routine:

(1) Set YBB.

(2) Read the SRDB 120 segment base (SRDS) and offset (SRDBP) from the channel, and use it to find and modify the SRSP field in the SRDB.

(3) Adjust that SRSP field back to its previous value, which may have been saved on the stack at operation 413*a*.

Figure 5:
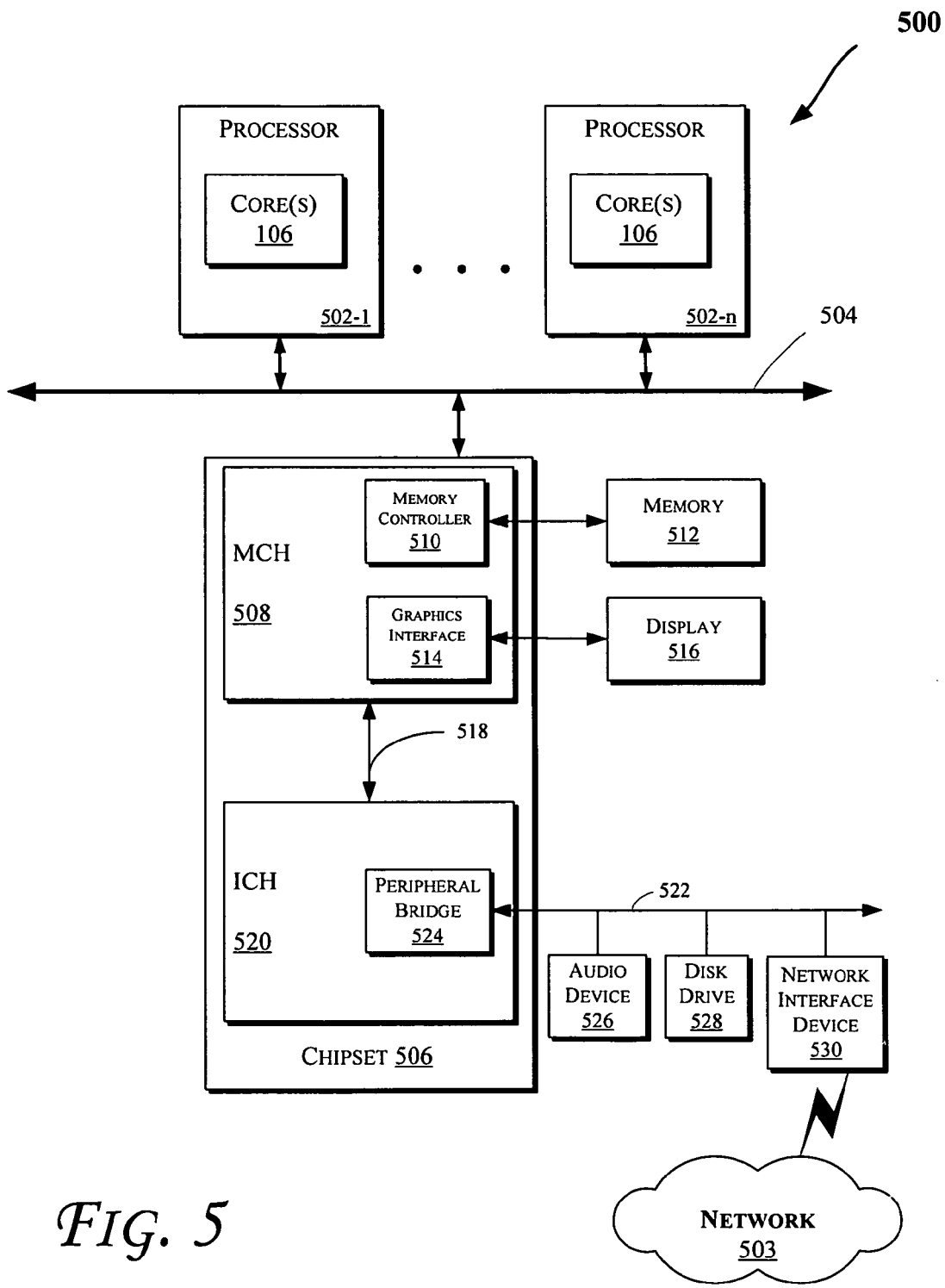

FIG. 5 illustrates a block diagram of a computing system 500 in accordance with an embodiment of the invention. The computing system 500 may include one or more central processing unit(s) (CPUs) 502 or processors that communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. In an embodiment, one or more of the processors 502 may be the same or similar to the processors 102 of FIG. 1. For example, one or more of the processors 502 may include one or more of the cores 106 discusses with reference to FIGS. 1 and/or 2. Also, the operations discussed with reference to FIGS. 1-4 may be performed by one or more components of the system 500.

A chipset 506 may also communicate with the interconnection network 504. The chipset 506 may include a memory control hub (MCH) 508. The MCH 508 may include a memory controller 510 that communicates with a memory 512 (which may be the same or similar to the memory 114 of FIG. 1). The memory 512 may store data, including sequences of instructions, that may be executed by the CPU 502, or any other device included in the computing system 500. In one embodiment of the invention, the memory 512 may include one or more volatile storage device(s) (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The MCH 508 may also include a graphics interface 514 that communicates with a display device 516. In one embodiment of the invention, the graphics interface 514 may communicate with the display device 516 via an accelerated graphics port (AGP). In an embodiment of the invention, the display 516 (such as a flat panel display) may communicate with the graphics interface 514 through, for example, a signal converter that translates a digital representation of an image stored in a storage device such as video memory or system memory into display signals that are interpreted and displayed by the display 516. The display signals produced by the display device may pass through various control devices before being interpreted by and subsequently displayed on the display 516.

A hub interface 518 may allow the MCH 508 and an input/output control hub (ICH) 520 to communicate. The ICH 520 may provide an interface to I/O device(s) that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503). Other devices may communicate via the bus 522. Also, various components (such as the network interface device 530) may communicate with the MCH 508 in some embodiments of the invention. In addition, the processor 502 and the MCH 508 may be combined to form a single chip. Furthermore, a graphics accelerator may be included within the MCH 508 in other embodiments of the invention.

Furthermore, the computing system 500 may include volatile and/or nonvolatile memory (or storage unit(s)). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 6:
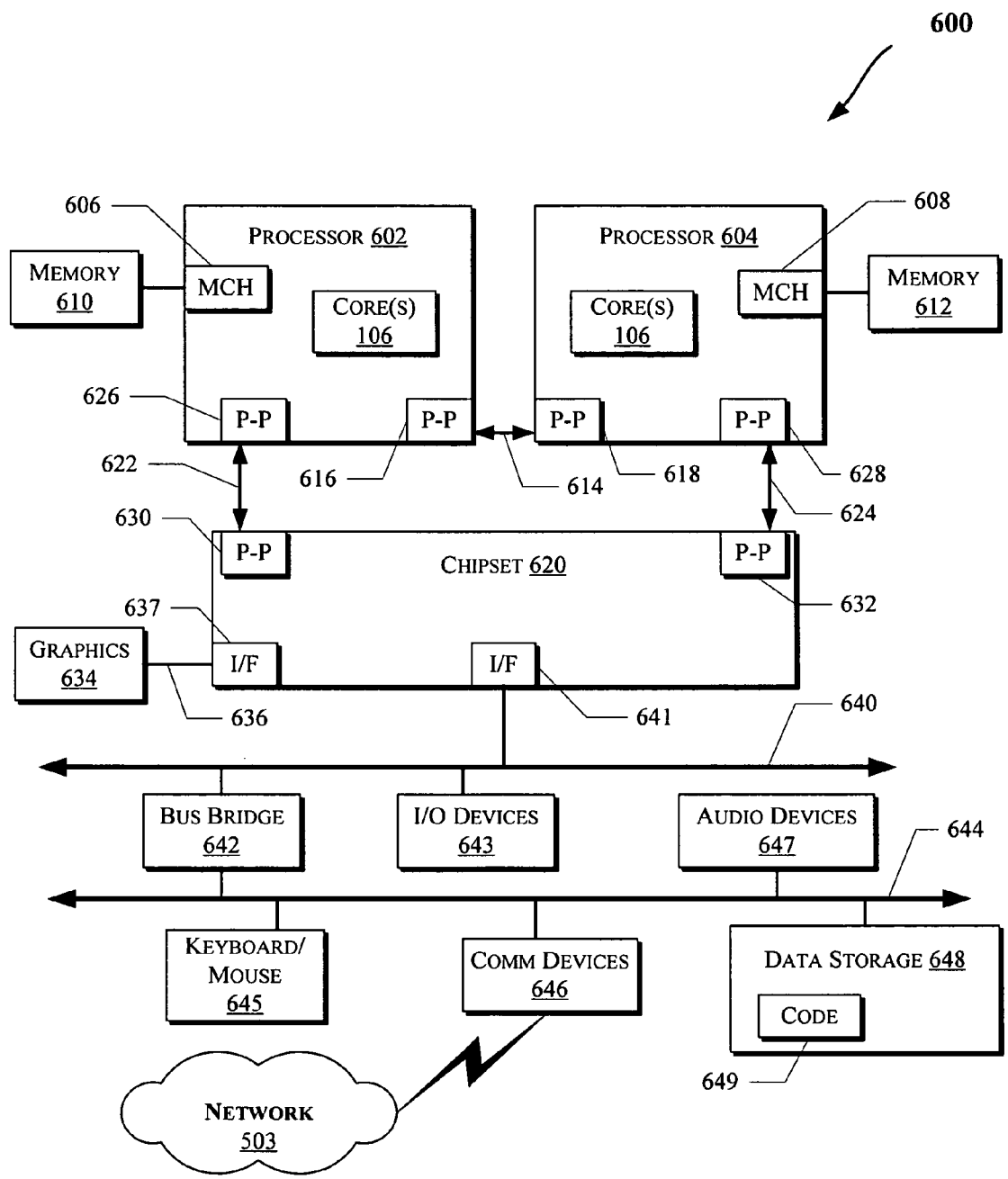

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a graphics circuit 634 via a graphics interface 636, e.g., using a PtP interface circuit 637.

At least one embodiment of the invention may be provided within the processors 602 and 604. For example, one or more of the cores 106 of FIGS. 1-2 may be located within the processors 602 and 604. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 using a PtP interface circuit 641. The bus 640 may communicate with one or more devices, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503), audio I/O device 647, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed with respect to FIGS. 1-6.

Additionally, such computer-readable media may be downloaded as a computer program product, wherein the program may be transferred from a remote computer (e.g., a server) to a requesting computer (e.g., a client) via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A processor comprising:
   an event monitoring logic to monitor and signal an occurrence of one or more events corresponding to architecturally defined scenarios in one channel of one or more channels, wherein the one or more channels are to correspond to a set of architecture state;
   a first storage unit to store data corresponding an event comprising a channel identifier and a scenario identifier;
   a first logic circuitry to update the first storage unit in response to data stored in the channel; and
   a second logic circuitry to cause invocation of a yield event routine, based on a service routine data block (SRDB) stored in a second storage unit, in response to the occurrence of the event, the second storage unit coupled to the processor and to store the SRDB accessed by a service routine base pointer (SRDS) and a service routine offset value (SRDBP) obtained from the channel, wherein the SRDB is to comprise:
   a service routine stack pointer (SRSP) and a service routine stack segment (SRSS) to identify a yield event stack to switch stacks across context switches without a need for saving and restoring the SRDB; and
   a service routine instruction pointer (SRIP) and a service routine code segment (SRCS) to identify the yield event routine to transfer control across context switches without a need for saving and restoring the SRDB.

2. The processor of claim 1, wherein the data corresponding to the event further comprises one or more of an index into a location within the second storage unit, or a count.

3. The processor of claim 1, wherein one or more of the first or second storage units comprise one or more of a private cache, a shared cache, or an application memory.

4. The processor of claim 1, further comprising a third storage unit to store the yield event routine.

5. The processor of claim 1, further comprising an execution unit to execute one or more instructions that cause the occurrence of the event.

6. The processor of claim 1, further comprising an execution unit that comprises the first logic circuitry.

7. The processor of claim 1, further comprising a plurality of processor cores, wherein at least one of the plurality of processor cores comprises one or more of the first logic circuitry or the first storage unit.

8. The processor of claim 1, wherein one or more of the first logic circuitry, the first storage unit, a plurality of processor cores, or a cache are on a same integrated circuit die.

9. A method comprising:
   monitoring and signaling an occurrence of one or more events associated with architecturally defined scenarios in one of a plurality of channels of a processor;
   updating data corresponding to an event in a first storage unit, the data comprising a channel identifier and a scenario identifier;
   storing a service routine data block (SRDB) accessed by a service routine base pointer (SRDS) and a service routine offset value (SRDBP) obtained from the channel in a second storage unit coupled to the processor, wherein the SRDB is to comprise a service routine stack pointer (SRSP) and a service routine stack segment (SRSS), the SRSP and the SRSS to identify a yield event stack to switch stacks across context switches without a need for saving and restoring the SRDB and wherein the SRDB is to comprise a service routine instruction pointer (SRIP) and a service routine code segment (SRCS) to identify a yield event routine to transfer control across context switches without a need for saving and restoring the SRDB; and
   invoking the yield event routine in response to an occurrence of the event and based on the SRDB stored in the second storage unit.

10. The method of claim 9, further comprising defining one or more conditions to monitor.

11. The method of claim 10, wherein storing data corresponding to the event in the first storage unit is performed in accordance with the defined one or more conditions.

12. The method of claim 9, further comprising generating a signal to indicate that the event has occurred and accessing the second storage unit in response to the generated signal.

13. The method of claim 9, further comprising saving data corresponding to the event in a stack or the SRDB.

14. The method of claim 9, further comprising restoring data corresponding to the event from a stack or the SRDB.

15. A storage device to store one or more instructions that when executed on a processor configure the processor to:
   monitor and signal an occurrence of one or more events associated with architecturally defined scenarios in one of a plurality of channels of the processor;

store data corresponding to an event in a first storage unit, the data comprising a channel identifier and a scenario identifier;

store a service routine data block (SRDB) accessed by a service routine base pointer (SRDS) and a service routine offset value (SRDBP) obtained from the channel in a second storage unit, wherein the SRDB is to comprise a service routine stack pointer (SRSP) and a service routine stack segment (SRSS), the SRSP and the SRSS to identify a yield event stack to switch stacks across context switches without a need for saving and restoring the SRDB and wherein the SRDB is to comprise a service routine instruction pointer (SRIP) and a service routine code segment (SRCS) to identify a yield event routine to transfer control across context switches without a need for saving and restoring the SRDB; and access the second storage unit in response to an occurrence of the event to invoke the yield event routine, wherein the yield event routine is to be invoked based on the SRDB stored in the second storage unit.

16. The storage device of claim 15, further comprising one or more instructions that configure the processor to define one or more conditions to monitor.

17. The storage device of claim 15, further comprising one or more instructions that configure the processor to read data corresponding to the event in a stack or the SRDB.

18. The storage device of claim 15, further comprising one or more instructions that configure the processor to restore data corresponding to the event from a stack or the SRDB.

19. A computing system comprising:

a memory to store data corresponding to a service routine data block (SRDB) accessed by a service routine base pointer (SRDS) and a service routine offset value (SRDBP) obtained from a channel, wherein the SRDB is to comprise a service routine stack pointer (SRSP) and a service routine stack segment (SRSS), the SRSP and the SRSS to identify a yield event stack to switch stacks across context switches without a need for saving and restoring the SRDB and wherein the SRDB is to comprise a service routine instruction pointer (SRIP) and a service routine code segment (SRCS) to identify a yield event routine to transfer control across context switches without a need for saving and restoring the SRDB;

a processor coupled to the memory to access the service routine data block, the processor to comprise:

the channel to store data corresponding to an event, the data comprising a channel identifier and a scenario identifier;

an event monitoring logic to monitor and signal an occurrence of one or more events corresponding with architecturally defined scenarios in the channel; and a first logic to cause access to the service routine data block to invoke the yield event routine corresponding to the event in response to an occurrence of the event and based on the SRDB stored in the memory.

20. The system of claim 19, wherein the data corresponding to the event further comprises a count.

21. The system of claim 19, wherein the service routine data block stores an address of a stack corresponding to the yield event routine.

22. The system of claim 19, wherein the memory comprises one or more of a private cache, a shared cache, or an application memory.

23. The system of claim 19, wherein the memory stores the yield event routine.

24. The system of claim 19, further comprising an execution unit to execute one or more instructions that cause the occurrence of the event.

25. The system of claim 19, further comprising an execution unit that comprises the first logic.

26. The system of claim 19, further comprising a plurality of processor cores, wherein the processor comprises the plurality of the processor cores and wherein at least one of the plurality of processor cores comprises the first logic.

27. The system of claim 19, further comprising an audio device coupled to the memory.

28. The processor of claim 2, wherein the index is to point to the address of the yield event routine.

29. The system of claim 19, wherein the data stored in the channel is to comprise an index into a location within the service routine data block and wherein the index is to point to the address of the yield event routine.

30. The processor of claim 1, wherein the one or more channels are to store information corresponding to an event that is not otherwise observable by software or hardware.

* * * * *